April 17, 1934.                R. CHILLINGWORTH                1,954,862
                AUTOMATICALLY ADJUSTABLE WINGS AND BLADES
                    FOR HELICOPTER AND PROPELLER SCREWS
                            Filed May 19, 1932
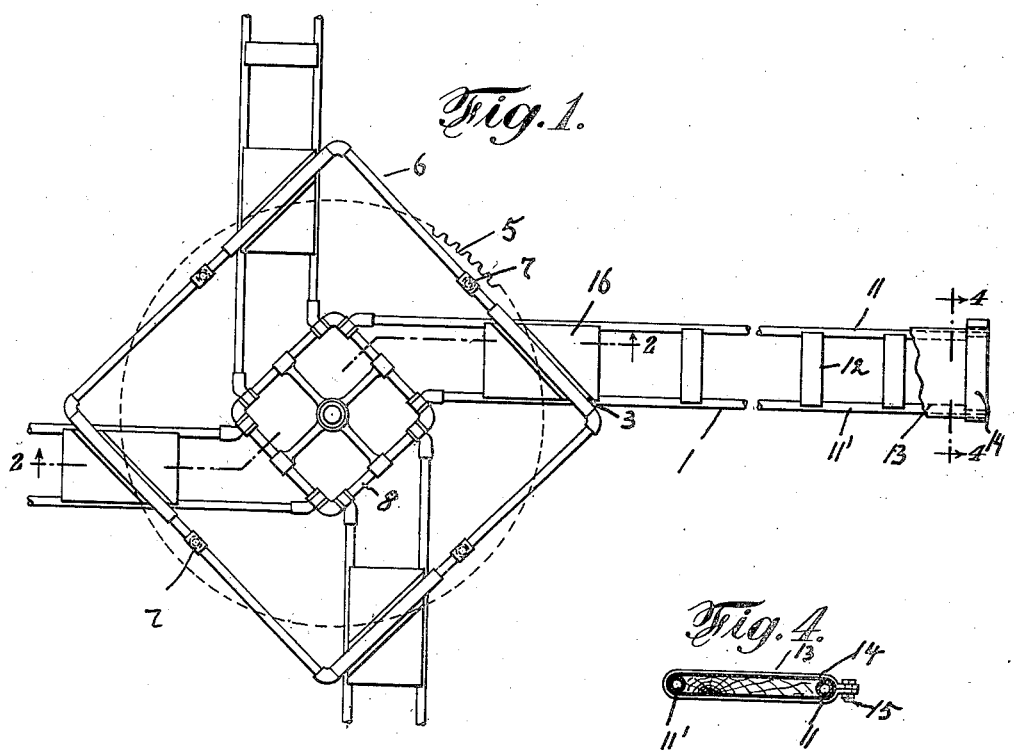
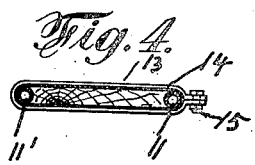
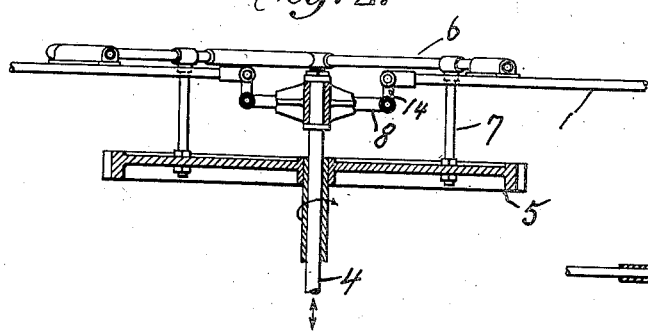
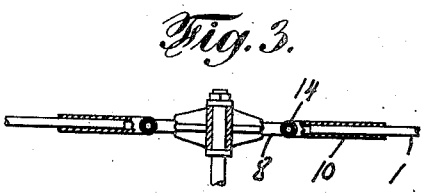
INVENTOR
Rudolph Chillingworth
BY
George C. Heinitz
ATTORNEY

UNITED STATES PATENT OFFICE 1,954,862

AUTOMATICALLY ADJUSTABLE WINGS AND BLADES FOR HELICOPTER AND PROPELLER SCREWS

Rudolph Chillingworth, Brooklyn, N. Y.

Application May 19, 1932, Serial No. 612,248

1 Claim. (Cl. 244—19)

This invention relates to a new method and construction of wings suitable for use with helicopters and propeller screws or blades.

The invention mainly consists in the combination of wings, blades or the like having an axis around which the wings or the like are adjusted at an angle of preferably 45° and the fuselage of the airplane or shaft of the helicopter or propeller.

Embodiments of my invention will be described hereinafter, shown in the accompanying drawing and subsequently pointed out in the subjoined claim.

The invention is illustrated by way of example in the accompanying drawing, in which:

Fig. 1 is a plan view of a wing or blade constructed according to my invention, showing the wing in connection with the known arrangements.

Figure 2 is a side elevation of the construction shown in Figure 1.

Fig. 3 is a front elevation of a simple arrangement for a possible axial adjustment to cause the change of pitch of the wing or blade.

Fig. 4 is a cross-section of the wing on line 4—4 of Figure 1.

Referring to Figure 1, the inner frame 8 has pivotally mounted thereto the wing 1 by means of the joints 14 or any other suitable means to allow the wing to be adjusted around the axis of the outer frame 6 which is connected by the posts or standards 7 to a driving wheel 5 driven by means of a suitable pinion or gear with its shaft 4 carrying frames 8 and 6.

If desired the inner frame could be either arranged as shown above or by prolongation of the joints 14 below the wheel 5 by making the posts shorter or longer.

Another very simple arrangement of the frame is shown in Figure 3 where the wings are sliding in a socket 10 pivotally mounted to frame 8 to allow an adjustment of the pitch.

As shown in Figure 4 the tubes 11, 11' made of a suitable material as for instance steel or duralumin or any other suitable material, the tubes are connected by cross-pieces 12 spaced from one another and reaching with their ends to half of the diameter of tubes 11, 11'. An aluminum cover 13 covers the wings and is held thereon by means of the bandages 14 which are clamped about the wings by means of the clamping devices 15.

The wings carry supporting plates 16 for the frame 6 on bearings 3.

In operation, the rotation of wheel 5 will lift frame 6 and the helicopter will ascend, while the wings will automatically change to a pitch suitable for the ascent of the machine while during the descent the wings will automatically adjust to a pitch favorable for the descent.

It will be understood that I have disclosed the preferred form of my invention only as an example, and that I may make such changes in the construction as come within the scope of the appended claim without departure from the spirit of my invention and the principles involved.

Having thus described my invention, what I claim as new and desire to secure by Letters Patent is:

In a rotating wing system for aircraft, an outer frame, a rotary driving element in which said outer frame is mounted, a similar inner frame rotating concentrically with said outer frame and axially adjustable relatively thereto and a wing construction pivotally mounted on said inner frame, composed of longitudinally extending tubes, cross-connections for said tubes displaceably secured thereto to allow, when displaced towards the ends of the wing, a regulation of the resistance, a sleeve covering said tubes, means to clamp said sleeve to the wing, and connections between said cross-connections and said tubes.

RUDOLPH CHILLINGWORTH.